US006284075B1

(12) United States Patent
Kaplan

(10) Patent No.: US 6,284,075 B1
(45) Date of Patent: Sep. 4, 2001

(54) DEVICE AND METHOD FOR APPLYING A DECORATIVE MATERIAL

(76) Inventor: Joan C. Kaplan, 43 Northwood Ave., Demarest, NJ (US) 07627

( * ) Notice: Subject to any disclaimer, the term of this patent is extended or adjusted under 35 U.S.C. 154(b) by 0 days.

(21) Appl. No.: 09/353,728

(22) Filed: Jul. 14, 1999

(51) Int. Cl.[7] .......... B32B 31/00

(52) U.S. Cl. .......... 156/71; 156/574; 156/575; 156/578; 156/579

(58) Field of Search .......... 156/71, 552, 574, 156/575, 578, 579

(56) References Cited

U.S. PATENT DOCUMENTS

| | | | | |
|---|---|---|---|---|
| 3,093,462 | | 6/1963 | Rapaport | 41/26 |
| 3,098,783 | * | 7/1963 | Busch et al. | 156/579 |
| 3,315,374 | | 4/1967 | Geraty | 35/26 |
| 3,680,225 | | 8/1972 | Ishida | 35/26 |
| 4,169,323 | | 10/1979 | Engel | 35/26 |
| 5,348,613 | * | 9/1994 | Blais | 156/579 |
| 5,418,024 | | 5/1995 | Inashvili | 428/38 |
| 5,445,704 | * | 8/1995 | Dizon | 156/574 |
| 5,772,247 | | 6/1998 | Legrand | 281/31 |
| 5,846,175 | * | 12/1998 | Chen | 492/13 |

* cited by examiner

*Primary Examiner*—James Sells
(74) *Attorney, Agent, or Firm*—Salter & Michaelson

(57) ABSTRACT

A device for applying a decorative material onto a substrate or base material, for example a piece of paper or a wall, is provided. The device includes a roller having the decorative material pre-applied on an outer surface thereof by an adhesive material. The adhesive material is utilized to temporarily adhere the decorative material to the outer surface of the roller until such time as the decorative material is applied to the base material. In one embodiment, the roller is removably mounted to the shaft and a plurality of rollers having different types, colors and/or shapes of decorative material are provided. In another embodiment, an adhesive tool to selectively apply the adhesive onto the base material, for example onto paper in the form of an adhesive pattern, according to the user's individual preference is also provided.

21 Claims, 5 Drawing Sheets

DEVICE AND METHOD FOR APPLYING A DECORATIVE MATERIAL

DESCRIPTION

1. Technical Field

The invention relates generally to a device for applying a decorative material onto a base material, the device including a roller having the decorative material, for example glitter, applied on an outer surface thereof.

2. Background of Related Art

Various types of decorating and crafting products are available in today's market which provide a method for decorating an object and which can also provide an outlet for creative expression by both adults and children alike. While many of these products fulfill their intended function and enjoy success, many others do not. To be successful, decorating or crafting products should ideally be fun and easy to use, should sustain the user's interest, should allow the user to express him or herself creatively, should be enjoyed by users of various artistic levels, and should be relatively easy to clean up. Generally, the more successful products have been able to achieve most, or all of these objectives. However, there is continued development in the field to provide new varieties of decorating and/or craft products for the continued enjoyment of children and adults alike.

Accordingly, it is an object of the present invention to provide a new and useful decorating and/or crafting product which allows a user to express him or herself artistically, which is fun and easy to use, which can sustain a user's interest, which can be enjoyed by users having various artistic levels (including children), and which is easy to clean up after use.

SUMMARY

In accordance with the present invention, there is provided a device for applying a decorative material onto a substrate or base material, for example paper or a wall. The device includes a roller having the decorative material pre-applied on an outer surface thereof, the roller being rotatably mountable onto a shaft member extending from a handle which can be grasped by a user. An adhesive is utilized to temporarily adhere the decorative material to the outer surface of the roller. In one embodiment, the roller is removably mounted to the shaft and a plurality of rollers having different types, colors and/or shapes of decorative material are provided. In another embodiment, an adhesive tool such as a glue stick or pen is also provided. The adhesive tool is used to selectively apply a second adhesive onto the base material, for example onto paper in the form of an adhesive pattern, according to the user's individual preference. A roller having a particular decorative material is then selected according to the user's preference and placed onto the shaft of the device. As the user moves the roller over the surface of the adhesive pattern, the decorative material becomes deposited onto the adhesive pattern in order to embellish the same. For the decorative material to be deposited onto the adhesive pattern, the adhesive which is utilized to temporarily adhere the decorative material to the roller should have a bonding strength which is less than that of the adhesive used to form the pattern.

BRIEF DESCRIPTION OF THE DRAWINGS

It should be understood that the drawings are provided for the purpose of illustration only and are not intended to define the limits of the invention. The foregoing and other objects and advantages of the embodiments described herein will become apparent with reference to the following detailed description when taken in conjunction with the accompanying drawings in which.

DETAILED DESCRIPTION OF THE ILLUSTRATIVE EMBODIMENTS

Figure 1:
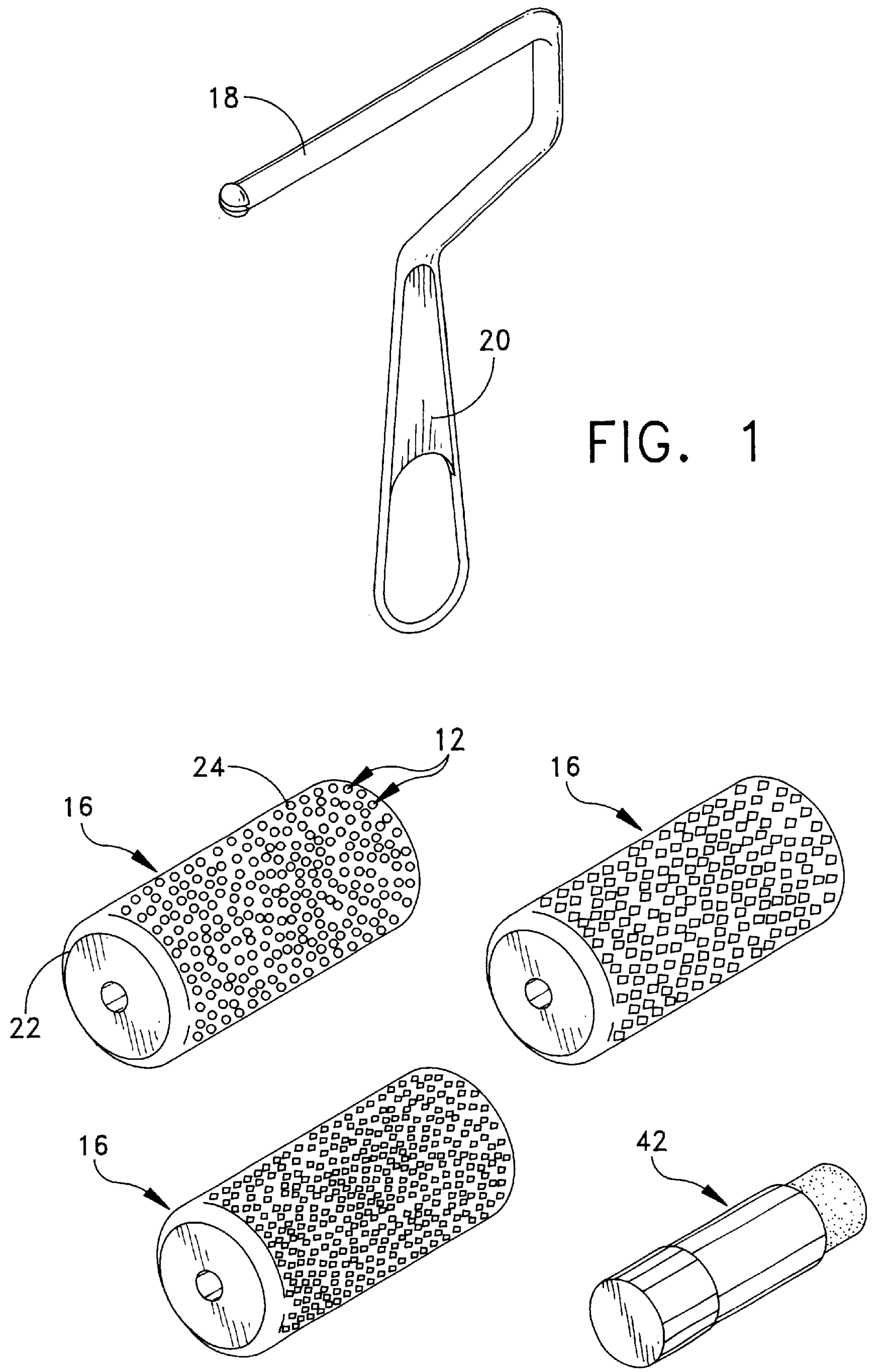
FIG. 1 is a perspective view of a device for applying a decorative material onto a substrate and a plurality of rollers having a variety of decorative material disposed thereon according to the present invention.
Figure 2:
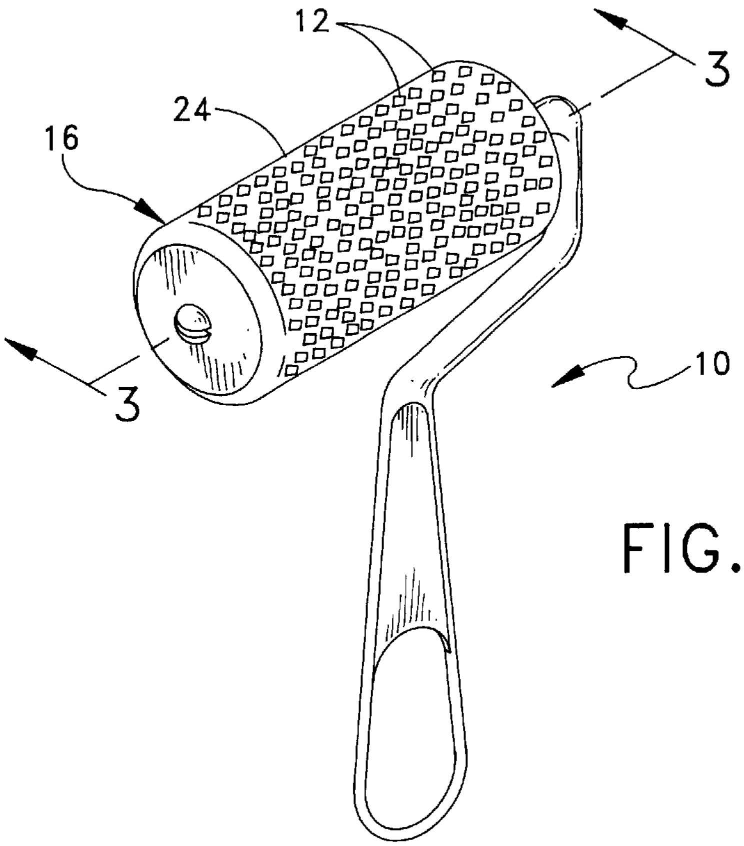
FIG. 2 is a perspective view of the device of FIG. 1 with a roller in place.
Figure 3:
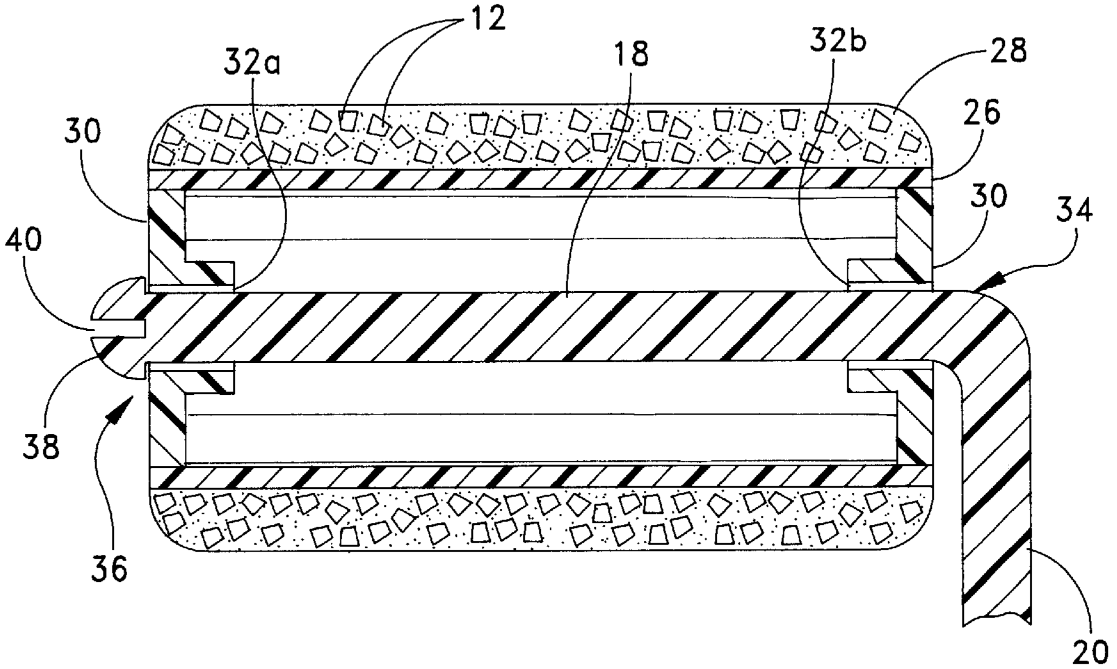
FIG. 3 is a cross- sectional view taken along lines 3—3 of FIG. 2.

A device 10 for applying a decorative material 12 onto a base material 14 is illustrated in FIGS. 1–3. The device 10 includes a roller 16 supportable on a shaft 18 which extends from a handle 20. The roller has a tubular body 22 with the decorative material 12 at least partially covering an outer surface of the roller. More than one roller may be provided, as shown in FIG. 1, each roller having a particular decorative material disposed thereon. The decorative material preferably includes a plurality of discrete embellishments, and may take any of a variety of shapes, sizes, colors, and forms including, but not limited to, glitter, sueded material and beads. In the present embodiment, the outer surface of the roller is coated with an adhesive 24, for example glue in the form of a spray, and the decorative material is then applied to the adhesive such that it covers at least a portion of the outer surface of the roller and is adhered thereto. One or more decorative materials may be applied to a single roller and sections of the roller may have different individual types of decorative material. The adhesive should be capable of adhering the decorative material to the outer surface of the roller until such time as the roller is used to apply the decorative material onto the base material. Because the decorative material is intended to be deposited onto a base material, it is considered to be temporarily adhered to the roller. One such glue spray capable of temporarily adhering the decorative material to the roller is Spra-Ment, which is available from 3M, Adhesive Division in St. Paul, Minn., although other adhesives may be utilized as would be known to one of skill in the art.

The roller is positioned on the shaft 18 such that it freely rotates about shaft in use, the roller, shaft and handle being conventional in design. In the present embodiment, the roller includes an inner core 26 and a cover 28 having an inner surface secured to the core 26 and an outer surface onto which the adhesive and the decorative material are applied. The roller may be disposable or reusable and may be permanently arranged over the shaft and/or handle, or may be removably mounted thereto. In the present embodiment, the roller is preferably disposable and removably mounted to the shaft, with the cover preferably being made of a nappy material which is preferably at least semi-absorbent for receiving the adhesive. As shown in FIG. 3, end caps 30 are inserted into either end of the tubular body 22 of the roller, each end cap having an opening 32*a*, 32*b* sized to fit over the shaft while permitting rotation of the roller thereabout. Shaft 18 may include a first end 34 extending from handle 20 and a second end 36 having an enlarged nub 38 with a slit 40 therethrough. Nub 38 preferably prevents the roller from sliding off the shaft during use, while slit 40 allows for compression of the nub in order to allow the roller to be inserted onto the shaft and removed therefrom. Since the roller, shaft and handle are all conventional in design, they may take any form as would be known to one of skill in the art, and are not limited to the above description which refers only to an illustrative embodiment. In addition, the roller may be provided separately for use with any of a number of know devices.

Figure 4:
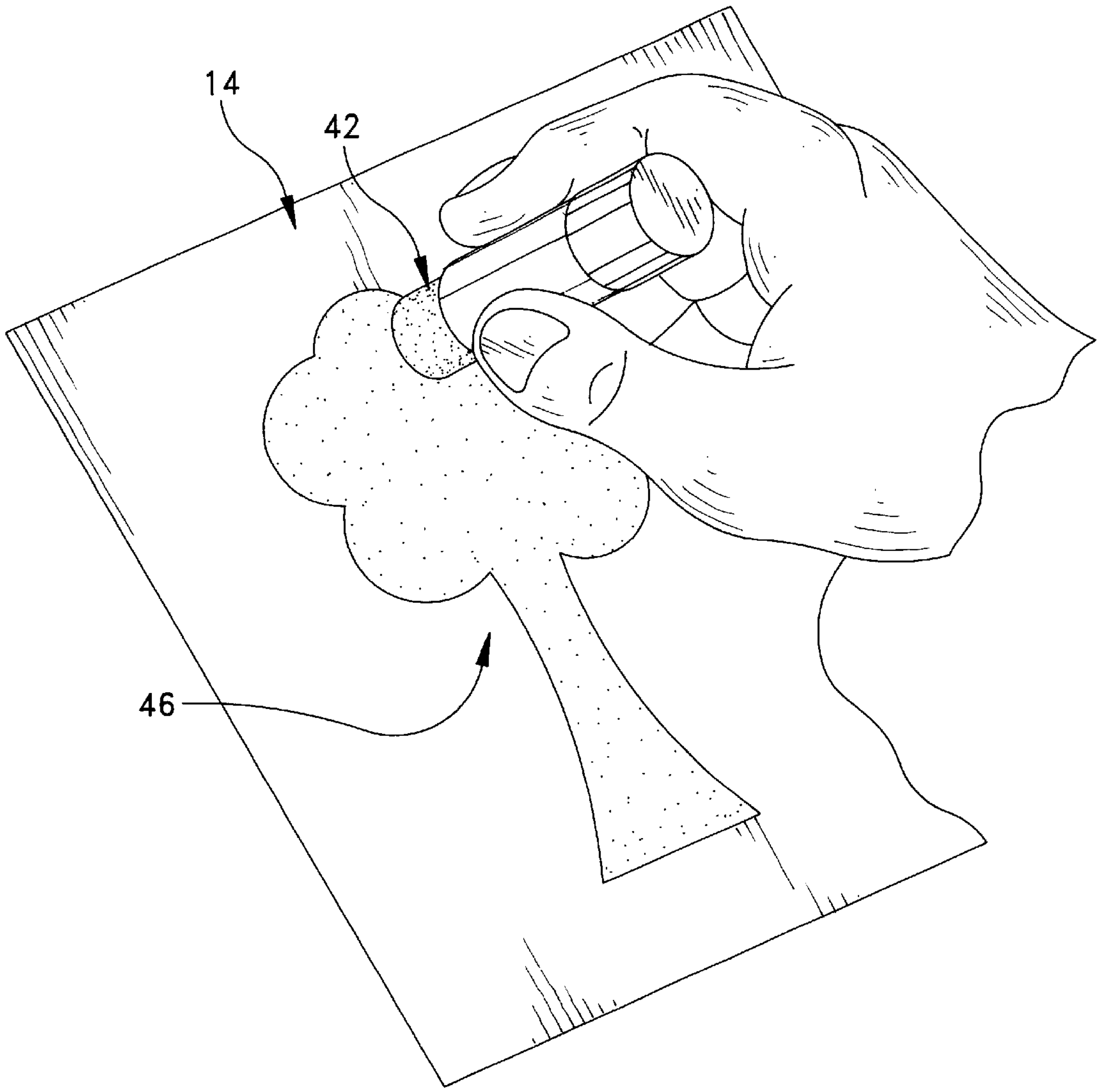
FIG. 4 is a schematic view illustrating a person selectively applying adhesive onto a substrate in the form of a decorative pattern.
Figure 5:
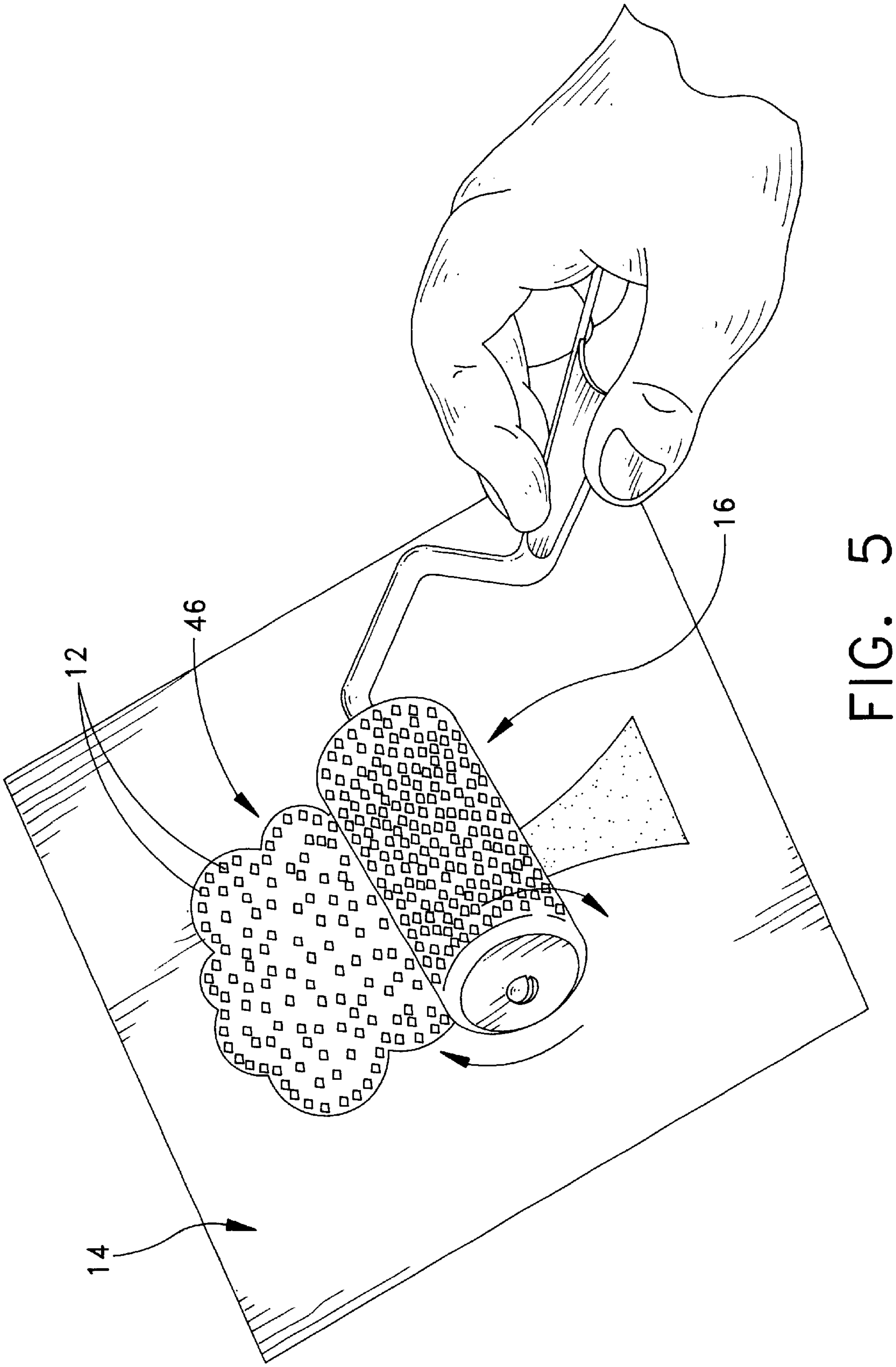
FIG. 5 is a schematic view illustrating the person using the device to apply the decorative material onto the adhesive pattern of FIG. 4.
Figure 6:
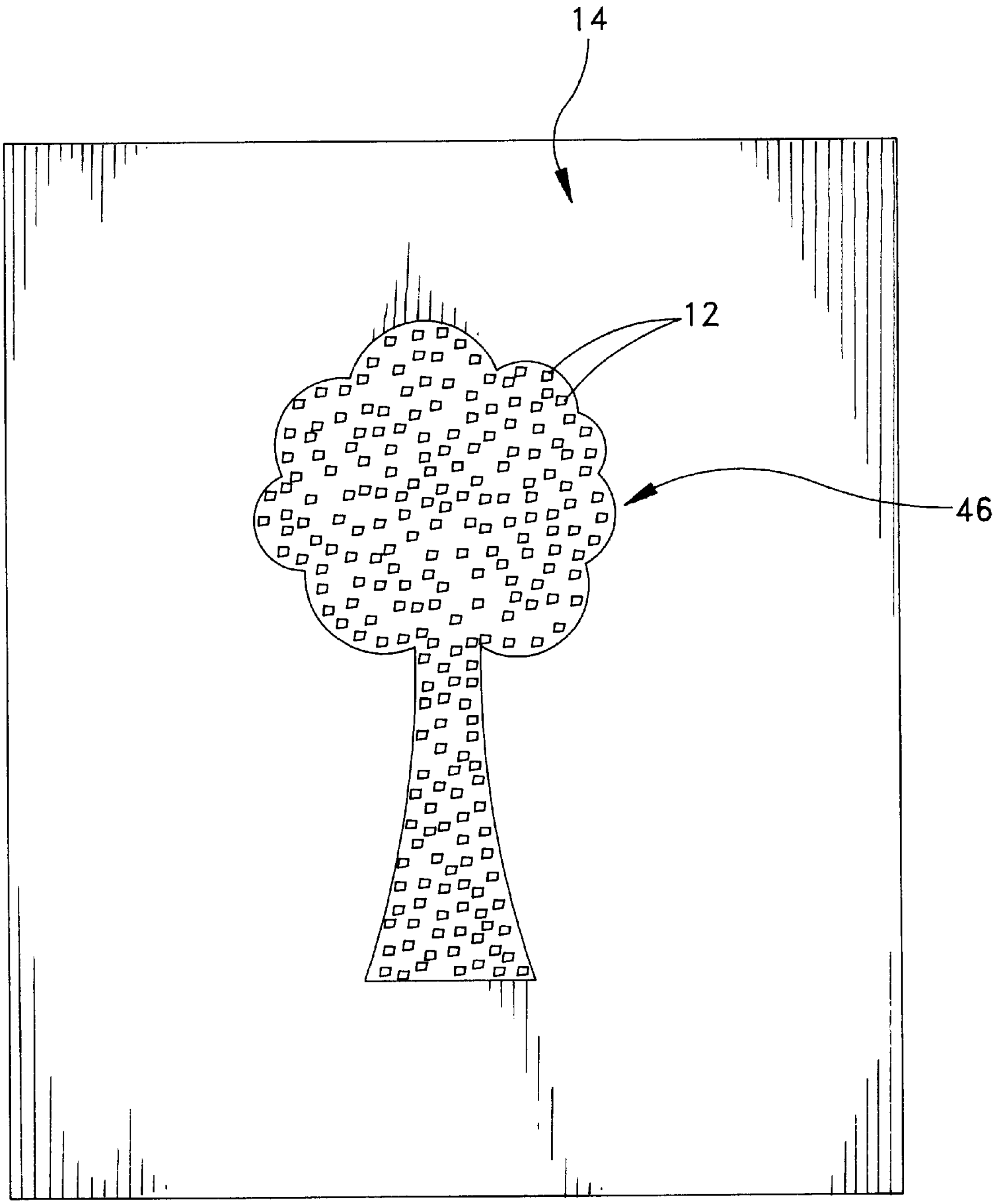
FIG. 6 is a schematic view illustrating the completed work after the decorative material has been applied onto the adhesive pattern.

Referring now to FIGS. 1 and 4–5, an adhesive tool 42 such as a glue stick or glue pen may also be provided. The adhesive tool may be conventional in design and is used to selectively apply an adhesive onto the base material, for example onto paper in the form of an adhesive pattern 46, according to the user's individual preference. The adhesive may be clear or may be tinted a particular color so that the user can see easily see the pattern he or she is drawing. If desired, the adhesive can dry clear, or the color may remain after the adhesive is dry. In use, as the user moves the roller with the decorative material over the surface of the adhesive pattern while the adhesive remains tacky, the decorative material becomes deposited onto the adhesive pattern in order to embellish the same (FIG. 5). For the decorative material to be deposited onto the adhesive pattern, the adhesive which is utilized to form the decorative pattern should have a bonding strength which is greater than that of the adhesive used to temporarily adhere the decorative material to the roller. In the present embodiment, glue pens available from Hunt Manufacturing Co. Of Slatesville, N.C. under the name X-Acto Permanent Glue Pen or X-Acto Repositionable Glue Pen have been utilized with the above-identified Spra-Ment adhesive to successfully transfer the decorative material to the adhesive pattern, although other types of adhesive may readily be utilized as would be known to one of skill in the art. Use of the roller with decorative material will now be described with reference to the figures.

In use, the user selectively applies an adhesive onto the base material. For example, as shown in FIG. 4, the user may draw a particular shape on a piece of paper utilizing a glue stick or pen. Alternately, the base material may be any material capable of receiving an adhesive, such a wall or clothing, or any other material. The adhesive is applied to the base material according to the user's preference and may selectively cover a portion of the base material or may substantially cover the entire base material. For example, the user may choose to selectively apply the adhesive to paper in the form of a pattern, such as the tree illustrated in FIGS. 4 and 5, or the user may substantially cover a wall with the adhesive for decorating the same. The present invention is not limited to the application of the adhesive in a particular manner or onto a particular base material.

The user then selects a roller having a decorative material pre-applied thereto as described above, for application onto a base material. The roller may be supported on a shaft attached to a handle, or may be inserted onto the shaft by the user. In either case, the roller should be freely rotatable about the shaft. The user contacts the adhesive, which is still tacky, with the outer surface of the roller and applies a light pressure while moving the roller over the adhesive, as shown in FIG. 5. By moving the roller over the adhesive as described, the decorative material is transferred from the roller and is deposited onto the adhesive, since the bonding strength of the adhesive on the roller is less than that of the adhesive applied to the base material. If desired, the roller may be removed from the shaft and a second roller having a second decorative material may be inserted onto the shaft and the process may be repeated on the already embellished pattern, or on a new pattern. After the decorative material is applied to the adhesive on the base material, the adhesive is allowed to dry. Once dry, the decorative material remains adhered to the base material, at least temporarily.

Thus, it can be seen that the present invention provides a new and useful decorating and/or crafting product which is fin and easy to use, which allows a user to express him or herself artistically, which can sustain a user's interest, which can be enjoyed by users having various artistic levels (including children), and which is easy to clean up after use.

It will be understood that various modifications may be made to the embodiment disclosed herein. For example, the adhesive used on the base material may be applied in any manner, including by another roller or paint brush, and may have any color or tint, including clear. In addition, the decorative material may be any type of material capable of being temporarily adhered to the roller and may be applied on a portion or over all of the base material. Also, any type of base material to which the decorative material can adhered may be utilized, other than those specifically disclosed herein. Therefore, the above description should not be construed as limiting, but merely as exemplifications of a preferred embodiment. Those skilled in the art will envision other modifications within the scope spirit of the invention.

What is claimed is:

1. A method for decorating a base material comprising the steps of:

applying an adhesive onto the base material;

selecting at least one roller having a decorative material temporarily adhered to at least a portion of an outer surface thereof by an adhesive having a bonding strength less than the adhesive applied to the base material; and contacting the adhesive on the base material with the decorative material on the roller;

moving the roller so as to deposit the decorative material onto the adhesive on the base material.

2. The method according to claim 1, further comprising the step of positioning the at least one roller onto a shaft such that the roller is rotatably supported on the shaft.

3. The method according to claim 1, further comprising the step of exchanging the at least one roller with another roller.

4. A device for decorating a base material comprising:

at least one roller having a body with an outer surface;

an adhesive applied to at least a portion of the outer surface of the roller; and a decorative material temporarily adhered to at least a portion of the outer surface of the roller by the adhesive.

5. The device according to claim 4, wherein the decorative material includes a plurality of discrete embellishments.

6. The device according to claim 5, wherein the decorative material is selected from the group consisting of glitter, sueded material or beads.

7. The device according to claim 4, further comprising a handle having a shaft extending therefrom.

8. The device according to claim 7, wherein the roller is rotatably supported on the shaft.

9. The device according to claim 8, wherein the roller is removably supported on the shaft such that the roller can be removed from the shaft by a user.

10. The device according to claim 4, wherein the at least one roller includes a plurality of rollers having decorative material applied to an outer surface thereof.

11. A device for decorating a base material comprising:

a handle;

a shaft supported by the handle;

at least one roller having a body constructed and arranged to be rotatably supported on the shaft and having an outer surface;

an adhesive applied to at least a portion of the outer surface of the roller;

a decorative material temporarily adhered to at least a portion of the outer surface of the roller by the adhesive.

12. The device according to claim 11, wherein the roller is removably supported on the shaft such that the roller can be removed from the shaft by a user.

13. The device according to claim 11, wherein the at least one roller includes a plurality of rollers having decorative material applied to an outer surface thereof.

14. The device according to claim 11, wherein the decorative material includes a plurality of discrete embellishments.

15. The device according to claim 14, wherein the decorative material is selected from the group consisting of glitter, sueded material or beads.

16. An kit for decorating a base material comprising:

at least one roller having an adhesive applied over at least a portion of an outer surface thereof and a decorative material temporarily adhered to at least a portion of the outer surface of the roller by the adhesive; and an adhesive tool for applying a second adhesive onto the base material, the second adhesive having a bonding strength greater than the adhesive applied to the roller.

17. The kit according to claim 16, further comprising a handle having a shaft extending therefrom constructed and arranged to rotatably support the at least one roller.

18. The kit according to claim 16, wherein the at least one roller includes a plurality of rollers having decorative material applied to an outer surface thereof.

19. The kit according to claim 16, wherein the second adhesive is tinted a color.

20. The kit according to claim 19, wherein the color is opaque.

21. The kit according to claim 19, wherein the color is visible when wet and invisible when dry.

* * * * *